US012701360B2

(12) United States Patent
Hirapara

(10) Patent No.: US 12,701,360 B2
(45) Date of Patent: Aug. 4, 2026

(54) SYSTEM AND METHOD FOR THREE-DIMENSIONAL CONTROL OF NOISE EMISSION IN INTERACTIVE SPACE

(71) Applicant: UNIVERSAL CITY STUDIOS LLC, Universal City, CA (US)

(72) Inventor: Cole Paresh Hirapara, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 335 days.

(21) Appl. No.: 17/852,276

(22) Filed: Jun. 28, 2022

(65) Prior Publication Data

US 2023/0370773 A1 Nov. 16, 2023

Related U.S. Application Data

(60) Provisional application No. 63/341,331, filed on May 12, 2022.

(51) Int. Cl.
*H04R 3/12* (2006.01)
*H04R 29/00* (2006.01)

(52) U.S. Cl.
CPC ............. *H04R 3/12* (2013.01); *H04R 29/001* (2013.01); *H04R 2430/01* (2013.01)

(58) Field of Classification Search
CPC .. H04B 11/00; H04R 2430/01; H04R 29/001; H04R 3/12; H04S 7/303
USPC ................................ 381/56–58, 320; 700/94
See application file for complete search history.

(56) References Cited

U.S. PATENT DOCUMENTS 7,039,197 B1 * 5/2006 Venkatesh .............. H04R 3/005 381/86
9,549,253 B2 1/2017 Alexandridis et al.
9,838,818 B2 12/2017 Seligmann et al.
10,284,991 B2 5/2019 Dougherty et al.
10,506,362 B1 * 12/2019 Gomes ................ G10L 21/0208
10,798,509 B1 10/2020 Lyren et al.
(Continued)

FOREIGN PATENT DOCUMENTS

AU 2018211314 B2 8/2019
AU 2020256377 A1 12/2020
EP 2168397 B1 7/2020

OTHER PUBLICATIONS

International Search Report and Written Opinion—PCT/US2023/020846—ISA/EPO—Oct. 23, 2023.

*Primary Examiner* — Lun-See Lao
(74) *Attorney, Agent, or Firm* — Fletcher Yoder, P.C.

(57) ABSTRACT

Aspects of the disclosure relate to methods, apparatus, and systems for controlling an emission of an audio track in a three-dimensional (3D) space. An audio system is configured to detect an emission of a first audio track via one or more speakers of a plurality of speakers, wherein the first audio track is associated with an attraction, and select a speaker of the plurality of speakers. The audio system is further configured to determine whether the selected speaker is within a predetermined distance from the attraction, determine whether the selected speaker is emitting a second audio track different from the first audio track if the selected speaker is within the predetermined distance from the attraction, and control the emission of the first audio track via the selected speaker if the selected speaker is not emitting the second audio track.

11 Claims, 10 Drawing Sheets

(56) References Cited

U.S. PATENT DOCUMENTS

| | | | | |
|---|---|---|---|---|
| 12,063,496 | B2 * | 8/2024 | Shin | H04S 7/303 |
| 2015/0016642 | A1 * | 1/2015 | Walsh | H04S 7/301 381/307 |
| 2016/0043699 | A1 * | 2/2016 | Sawa | H04R 3/005 381/57 |
| 2019/0289417 | A1 * | 9/2019 | Tomlin | H04S 3/008 |

* cited by examiner

SYSTEM AND METHOD FOR THREE-DIMENSIONAL CONTROL OF NOISE EMISSION IN INTERACTIVE SPACE

CROSS-REFERENCE TO RELATED APPLICATION

This application claims priority to and the benefit of U.S. Provisional Application Ser. No. 63/341,331 entitled "SYSTEM AND METHOD FOR THREE-DIMENSIONAL CONTROL OF NOISE EMISSION IN INTERACTIVE SPACE" filed on May 12, 2022, the entire contents of which is incorporated herein by reference as if fully set forth below in its entirety and for all applicable purposes.

TECHNICAL FIELD

The technology discussed below relates generally to audio emission systems, and more particularly, to controlling audio levels of multiple audio tracks emitted in a three-dimensional (3D) interactive space.

INTRODUCTION

In an amusement park setting, multiple sources may simultaneously emit sound within a given vicinity. The sources may be close enough to each other such that the sound emitted from one source may interfere with the sound emitted from one or more other sources.

For example, an area of the park may include numerous attractions (e.g., restaurant, stage show, carnival game, store, etc.), each having an individual sound (audio track) associated with the attraction. Moreover, each attraction may have its own speakers playing the associated audio track independently. If the attractions are near enough to each other, then the simultaneous and independent emissions of two or more audio tracks may cause the audio track emissions to interfere with each other. This results in an unpleasant listening experience for a park guest if the simultaneous track emissions become an amalgamation of noise emanating from different directions and different attractions that do not sonically balance due to the audio tracks being emitted independently without cohesion.

Accordingly, the present disclosure is directed to a unified audio system that controls the emission of multiple audio tracks (associated with multiple attractions) in a cohesive manner using a set of speakers. The audio system will determine which speakers in the set of speakers to use and the most effective way to use such speakers so as to prevent the multiple audio track emissions from interfering with each other and facilitate a better listening experience for the park guest.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to methods, apparatus, and systems for controlling an emission of an audio track in a three-dimensional (3D) space. In one example, an audio system is disclosed. The audio system includes a plurality of speakers and a control system coupled to the plurality of speakers. The control system is configured to detect an emission of a first audio track via one or more speakers of the plurality of speakers, wherein the first audio track is associated with an attraction, select a speaker of the plurality of speakers, and determine whether the selected speaker is within a predetermined distance from the attraction. The control system is further configured to determine whether the selected speaker is emitting a second audio track different from the first audio track if the selected speaker is within the predetermined distance from the attraction, and control the emission of the first audio track via the selected speaker if the selected speaker is not emitting the second audio track. The audio system also includes an element detection system configured to determine a proximity of the selected speaker to the attraction and determine whether the emission of the first audio track via the selected speaker interferes with the emission of another audio track, a 3D modeler configured to determine whether the emission of the first audio track via the selected speaker causes an echo and/or reverberation through the selected speaker, and one or more feedback microphones configured to determine whether a noise level in a vicinity of the selected speaker or the attraction interferes with the emission of the first audio track via the selected speaker. Other aspects, embodiments, and features are also claimed and described.

In one example, a method of controlling an emission of an audio track in a three-dimensional (3D) space is disclosed. The method includes detecting an emission of a first audio track via one or more speakers of a plurality of speakers, wherein the first audio track is associated with an attraction, selecting a speaker of the plurality of speakers, determining whether the selected speaker is within a predetermined distance from the attraction, determining whether the selected speaker is emitting a second audio track different from the first audio track if the selected speaker is within the predetermined distance from the attraction, and controlling the emission of the first audio track via the selected speaker if the selected speaker is not emitting the second audio track.

In one example, a control system for controlling an emission of an audio track in a three-dimensional (3D) space is disclosed. The control system includes at least one processor and a memory coupled to the at least one processor. The at least one processor is configured to detect an emission of a first audio track via one or more speakers of a plurality of speakers, wherein the first audio track is associated with an attraction, select a speaker of the plurality of speakers, determine whether the selected speaker is within a predetermined distance from the attraction, determine whether the selected speaker is emitting a second audio track different from the first audio track if the selected speaker is within the predetermined distance from the attraction, and control the emission of the first audio track via the selected speaker if the selected speaker is not emitting the second audio track.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

Multiple audio sources simultaneously emitting sound in a defined area or space, such as in an amusement park environment, may be within a distance from each other such that the sound emitted from one audio source interferes with the sound emitted from one or more other audio sources. Accordingly, a system for controlling the sound emitted from the audio sources in the defined area or space may be utilized to reduce or eliminate the sound interference.

In an aspect, a unified audio system may control the emission of multiple audio tracks in a three-dimensional (3D) using a set of speakers. The unified audio system may adjust the volume of each audio track and control which speakers in the set to output an audio track from such that one or more specific audio tracks may be more audible in the space than other audio tracks. Accordingly, the system may reduce the sound interference (noise) from audio tracks that bleed into spaces not meant to hear such tracks. In an aspect, the system may individually and actively control the volume levels of each speaker and track based on feedback from a set of input devices. As such, speakers and audio tracks may be added or removed from the space at will and the system may compensate for the addition or removal to maintain the audio within defined limits.

Figure 1:
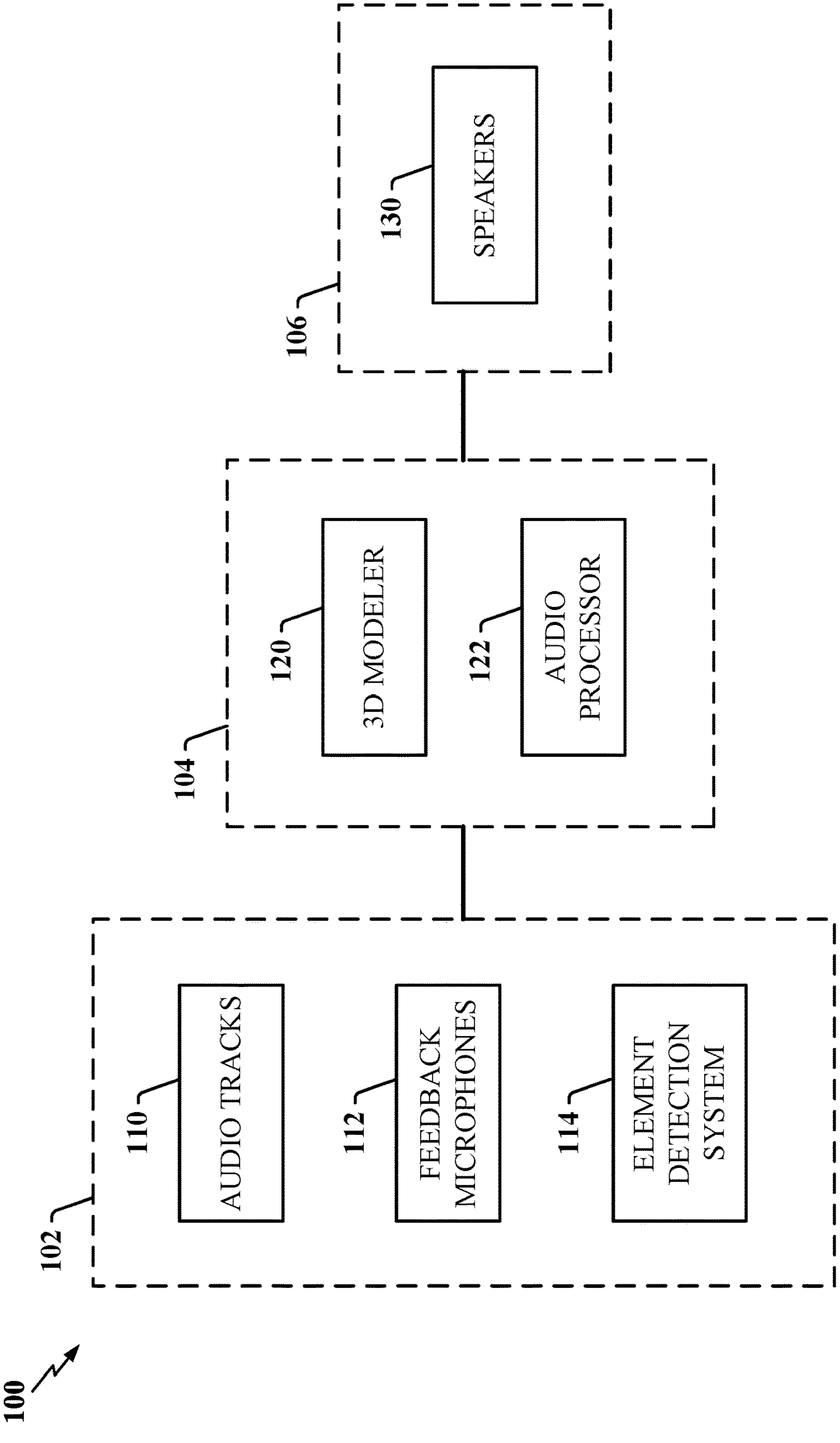
FIG. 1 illustrates an example audio system according to an aspect of the present disclosure.

FIG. 1 illustrates an example audio system 100 according to an aspect of the present disclosure. The audio system 100 may, for example, be implemented in a defined three-dimensional (3D) space, such as a themed land or region in an amusement park environment. The audio system 100 may include one or more input devices 102, one or more processing devices 104, and one or more output devices 106.

As an example, input devices 102 may include audio tracks 110. The audio tracks 110 refer to streams of recorded sound (e.g., music, messages, etc.) fixed in one or more storage mediums. The sound of the audio tracks 110 may be emitted and/or output via the output devices 106. In an aspect, each audio track 110 may be associated with a different device, attraction, and/or interactive element having a defined position within the 3D space.

The input devices 102 may also include feedback microphones 112 configured to detect noise levels within the 3D space. In an aspect, the feedback microphones 112 may be placed at various locations such that each microphone may have a defined position within the space. Accordingly, a feedback microphone placed at a specific location (defined position) may detect sounds that interfere with the emission of an audio track meant to be heard at the specific location. For example, an interfering sound may be due to the emission of a different audio track not meant to be heard at the specific location or random noises generated by humans, machinery, weather conditions, etc.

The input devices 102 may further include an element detection system 114. In an aspect, an audio track may be associated with an object that moves within the 3D space, such as a walk-around character or a parade float. When the object travels within the space, the emission of the audio track associated with the object may also travel so that the audio track can be heard within the vicinity of the object. Accordingly, the element detection system 114 is a real-time 3D positioning system configured to detect the movement of the object within the space that facilitates the emission of the audio track associated with the object to travel with the object's movement.

The processing devices 104 are the control system of the audio system 100. As an example, the processing devices 104 may include a 3D modeler 120. The 3D modeler 120 is a computational device for determining and/or providing a 3D model of the soundscape. That is, the 3D modeler 120 is configured to determine and/or provide a layout of the 3D space as well as a location of each device, attraction, and/or interactive element having a defined position within the space. The 3D modeler 120 is also configured to determine and/or provide surfaces within the 3D space that may interfere with the emission of an audio track. This allows an audio engineer to locate a new device, attraction, and/or interactive element into the 3D space and adjust its parameters.

The processing devices 104 may also include an audio processor 122. The audio processor 122 is configured to receive inputs and data from the audio tracks 110, the feedback microphones 112, the element detection system 114, and/or the 3D modeler 120 described above and produce sound through the output devices 106. In an aspect, the audio processor 122 is configured to measure microphone inputs from the feedback microphones 112 placed at various locations within the 3D space and compute the noise level at each location. The audio processor 122 also configured to determine the time of flight and travel of each audio track 110.

The output devices 106 include speakers 130. Thus, the sound of the audio tracks 110 may be emitted through a 3D space via the speakers 130. In an aspect, the speakers 130 have a defined position and direction in the 3D space. Moreover, the speakers 130 are configured to be controlled by the audio processor 122. For example, the audio processor 122 may adjust a volume of (or disable) a speaker 130 so as to reduce the volume of noise or any other sound emitted from the speaker 130.

Aspects of the disclosure will be described with respect to the figures below. In the figures, examples are presented in a two-dimensional (2D) space. However, it is contemplated that the operations described may also be implemented in a three-dimensional (3D) space, wherein the sound from audio tracks may be emitted from different heights.

Figure 2:
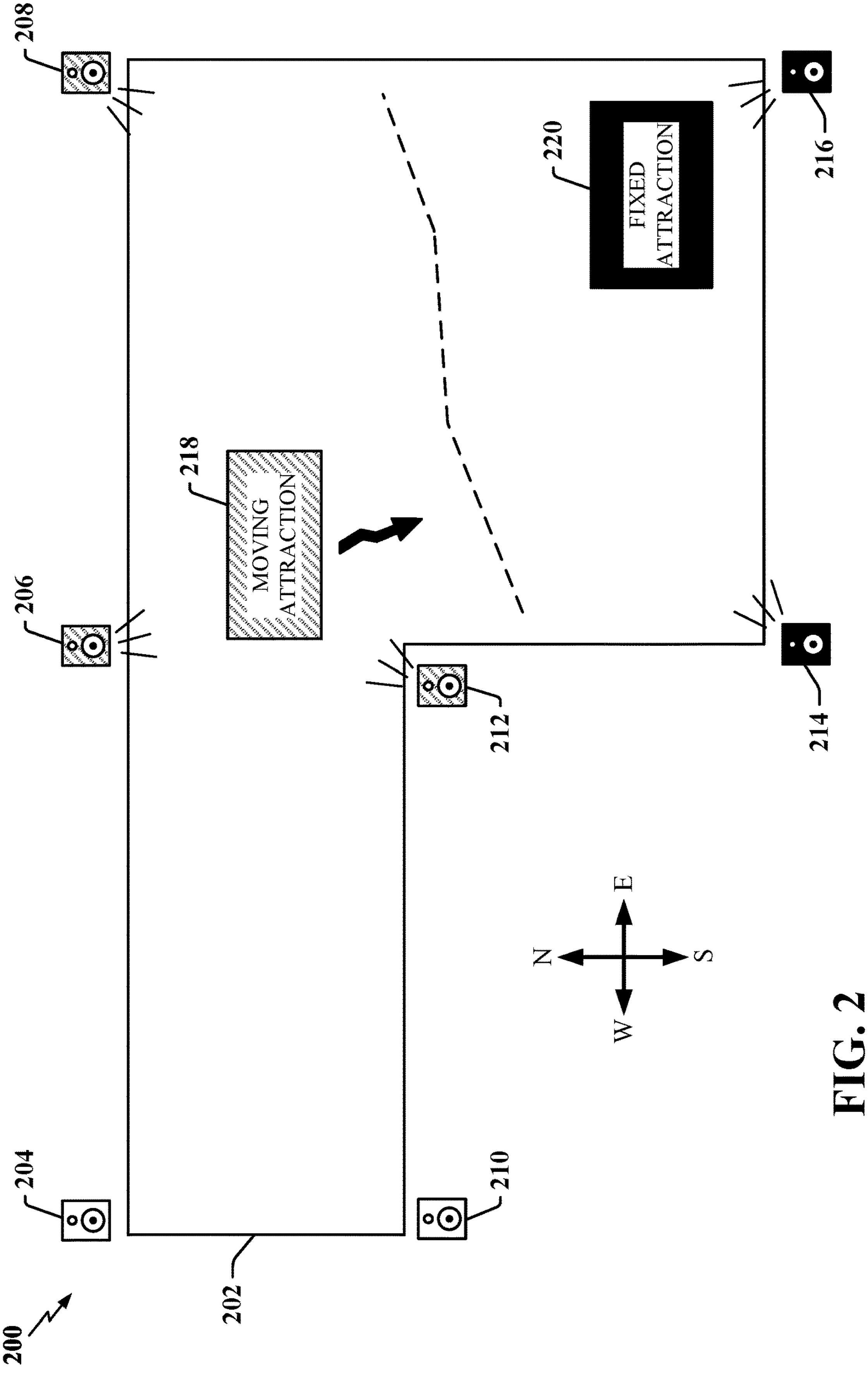
FIG. 2 illustrates an example implementation of an audio system in a three-dimensional (3D) space according to an aspect of the present disclosure.

FIG. 2 illustrates an example implementation 200 of an audio system (e.g., audio system 100) in a three-dimensional (3D) space 202 according to an aspect of the present disclosure. The 3D space 202 may be, for example, a themed land or region of an amusement park. In an aspect, one or more speakers of the audio system may be placed at various locations throughout the space 202. For example, a first speaker 204, a second speaker 206, and a third speaker 208 may be placed at a northern edge of the space 202, a fourth speaker 210 and a fifth speaker 212 may be placed at a central portion of the space 202, and a sixth speaker 214 and a seventh speaker 216 may be placed at a southern edge of the space 202. Accordingly, each of the speakers 204, 206, 208, 210, 212, 214, and 216 have a defined position and direction in the space 202.

A moving attraction 218 (e.g., walk-around character or parade float) may travel within the space 202. A non-moving (fixed) attraction 220 (e.g., restaurant, carnival game booth, or show stage) may be set at a fixed location within the space 202. In an aspect, the audio system is configured to emit an audio track associated with an attraction through one or more speakers in the vicinity of the attraction. For example, while the moving attraction 218 is at its current location in the space 202, the audio system may determine (e.g., via the element detection system 114) a location of the moving attraction 218 and emit an associated audio track based on the determined location. As such, the audio system may emit the moving attraction's associated audio track via the second speaker 206, the third speaker 208, and the fifth speaker 212, which are in the vicinity of the moving attraction 218. Similarly, the audio system may determine (or previously know) a location of the fixed attraction 220 and emit an audio track associated with the fixed attraction 220 based on the fixed attraction's location. Accordingly, the audio system may emit the fixed attraction's associated audio track via the sixth speaker 214 and the seventh speaker 216, which are in the vicinity of the fixed attraction 220.

Figure 3:
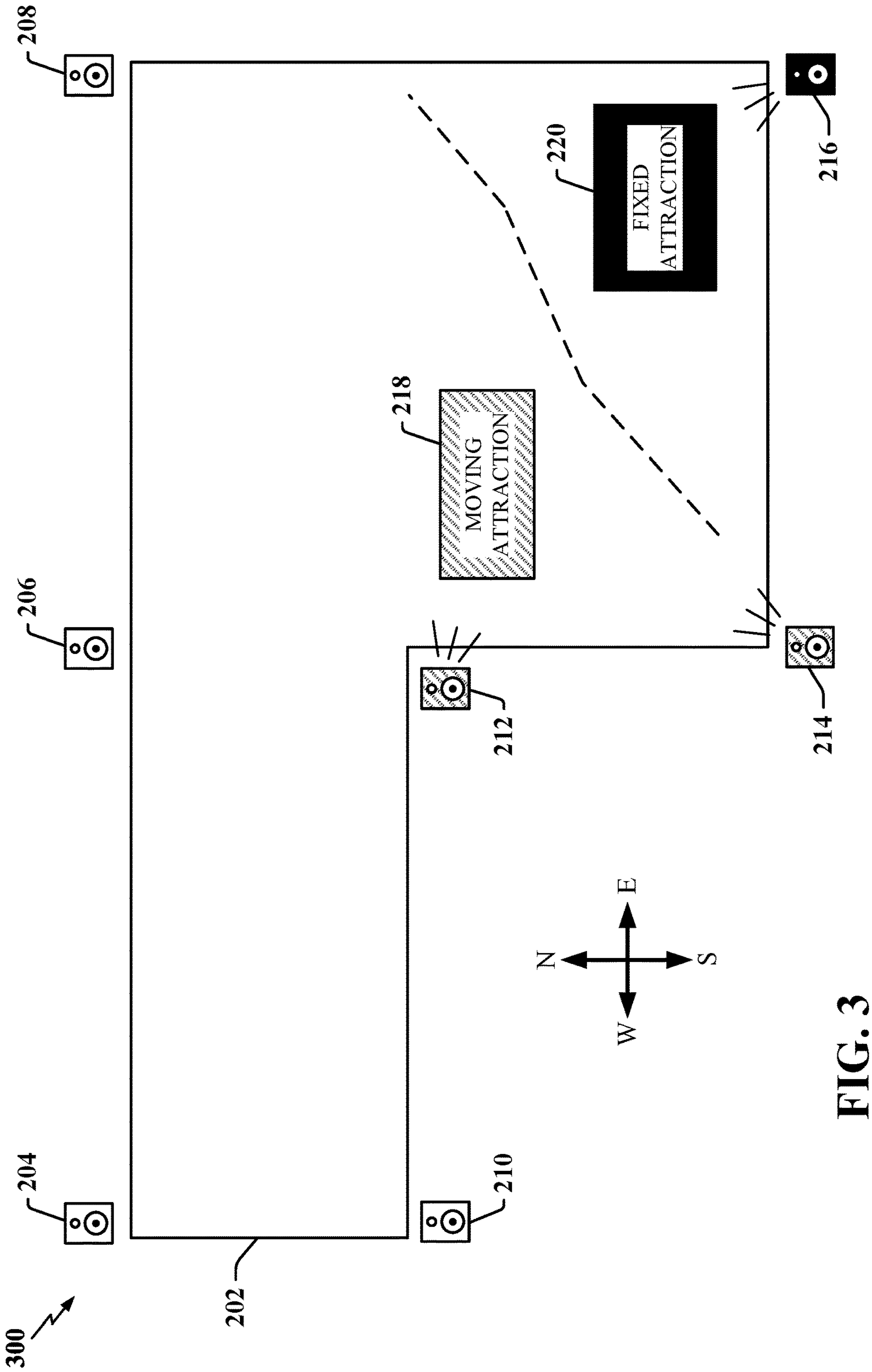
FIG. 3 illustrates another example implementation of the audio system in the three-dimensional (3D) space of FIG. 2 according to an aspect of the present disclosure.

FIG. 3 illustrates another example implementation 300 of the audio system (e.g., audio system 100) in the three-dimensional (3D) space 202 of FIG. 2 according to an aspect of the present disclosure. As shown, the moving attraction 218 has moved toward a southern edge of the space 202 closer to the fixed attraction 220. In an aspect, when the moving attraction 218 travels in the space 202, the emission of the audio track associated with the moving attraction 218 may also travel with the moving attraction 218 so that the associated audio track may continue to be heard in the vicinity of the moving attraction 218. For example, when the moving attraction 218 arrives at its location in the space 202 of FIG. 3, the audio system may determine (e.g., via the element detection system 114) the new location of the moving attraction 218 and emit an associated audio track based on the new location. As such, the audio system may emit the moving attraction's associated audio track via the fifth speaker 212 and the sixth speaker 214, which are now in the vicinity of the moving attraction 218. Notably, to emit the moving attraction's associated audio track via the sixth speaker 214, the audio system will cease emission of the fixed attraction's audio track via the sixth speaker 214 (as shown in FIG. 2) to allow for the emission of the moving attraction's audio track through the sixth speaker 214.

In an aspect, when the moving attraction 218 moves toward the southern edge of the space 202, the audio system may determine that the moving attraction 218 is no longer in the vicinity of the second speaker 206 and the third speaker 208. Accordingly, the audio system may cease emission of the moving attraction's associated audio track via the second speaker 206 and the third speaker 208 to allow other audio tracks to be emitted through such speakers.

In a further aspect, when two attractions are near each other, the audio track associated with one of the attractions may be prioritized and/or preferred over the audio track associated with the other attraction to prevent interference between audio tracks. For example, when the moving attraction 218 moves near the fixed attraction 220, the emission of the audio track associated with the fixed attraction 220 may interfere with (e.g., disrupt listening enjoyment of) the emission of the audio track associated with the moving attraction 218. Thus, if the audio track associated with the moving attraction 218 has priority (is preferred) over the audio track associated with the fixed attraction 220, then the audio system may reduce the volume of the emission of the fixed attraction's associated audio track via the seventh speaker 216 so as not to interfere with the emission of the moving attraction's associated audio track via the fifth speaker 212 and the sixth speaker 214.

Figure 4:
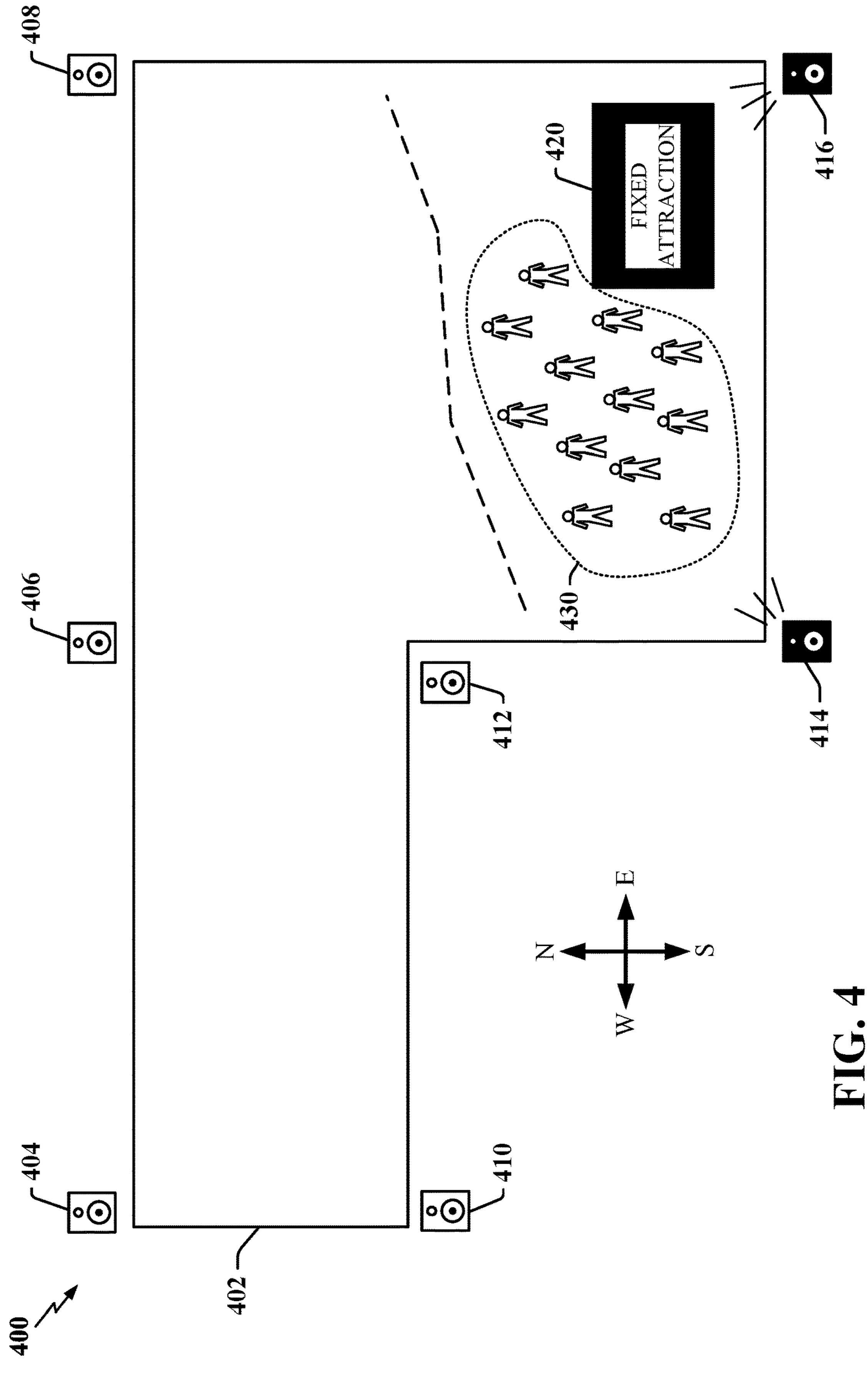
FIG. 4 illustrates an example implementation of an audio system in a three-dimensional (3D) space according to an aspect of the present disclosure.

FIG. 4 illustrates an example implementation 400 of an audio system (e.g., audio system 100) in a three-dimensional (3D) space 402 according to an aspect of the present disclosure. Similar to the 3D space 202 described above with respect to FIG. 2, the 3D space 402 of FIG. 4 may be, for example, a themed land or region of an amusement park. Moreover, one or more speakers of the audio system may have a defined position and direction and be placed at various locations throughout the space 402. For example, a first speaker 404, a second speaker 406, and a third speaker 408 may be placed at a northern edge of the space 402, a fourth speaker 410 and a fifth speaker 412 may be placed at a central portion of the space 402, and a sixth speaker 414 and a seventh speaker 416 may be placed at a southern edge of the space 402.

A non-moving (fixed) attraction 420 (e.g., restaurant, carnival game booth, or show stage) may be set at a fixed location within the space 402. Moreover, the audio system may be configured to emit an audio track associated with the fixed attraction 420 through one or more speakers in the vicinity of the attraction. For example, the audio system may determine (or previously know) a location of the fixed attraction 420 (e.g., via the element detection system 114) and emit an audio track associated with the fixed attraction 420 based on the fixed attraction's location. Accordingly, the audio system may emit the fixed attraction's associated audio track via the sixth speaker 414 and the seventh speaker 416, which are in the vicinity of the fixed attraction 420.

In an aspect, when one or more noise-generating entities 430 (e.g., loud group of people) move near the fixed attraction 420, the noise generated by the entities 430 may interfere with (e.g., disrupt listening enjoyment of) the emission of the audio track associated with the fixed attraction 420. Accordingly, the audio system may compensate for the increased noise and reduce the interference on the audio track, as will be described with respect to FIG. 5 below.

Figure 5:
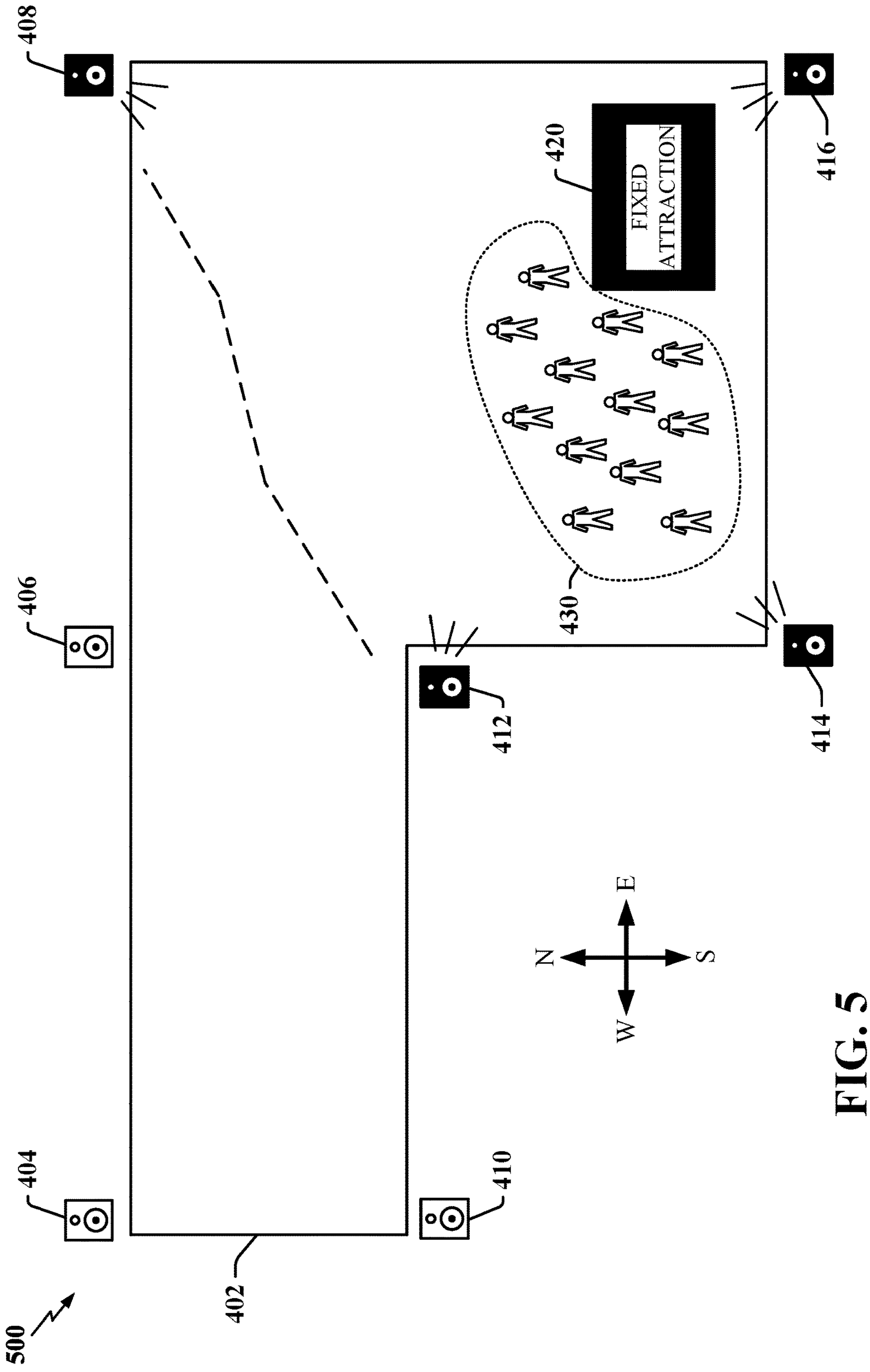
FIG. 5 illustrates another example implementation of the audio system in the three-dimensional (3D) space of FIG. 4 according to an aspect of the present disclosure.

FIG. 5 illustrates another example implementation 500 of the audio system (e.g., audio system 100) in the three-dimensional (3D) space 402 of FIG. 4 according to an aspect of the present disclosure. In an aspect, when the noise-generating entities 430 (e.g., loud group of people) move near the fixed attraction 420, one or more feedback microphones (e.g., feedback microphones 112) placed near the fixed attraction 420 may detect a change in sound level for the area near the fixed attraction 420. Based on the detected sound level, the audio system may determine (e.g., via the audio processor 122) that the noise caused by the entities 430 exceeds a threshold and interferes with the emission of the audio track associated with the fixed attraction 420. Accordingly, the audio system may compensate for the noise and facilitate a better listening experience (e.g., for amusement park guests) by increasing the volume of the sixth speaker 414 and the seventh speaker 416 when emitting the fixed attraction's associated audio track.

In an aspect, the audio system may also utilize speakers far away from (not in a local vicinity of) the fixed attraction 420 to augment the sound of the audio track and further increase its listening enjoyment. For example, the audio system may compensate for the noise caused by the entities 430 by also emitting the fixed attraction's audio track through the third speaker 408 and the fifth speaker 412. Thus, the audio system can expand the area of audio track emission to account for the presence of the noise-generating entities 430 near the fixed attraction 420.

Figure 6:
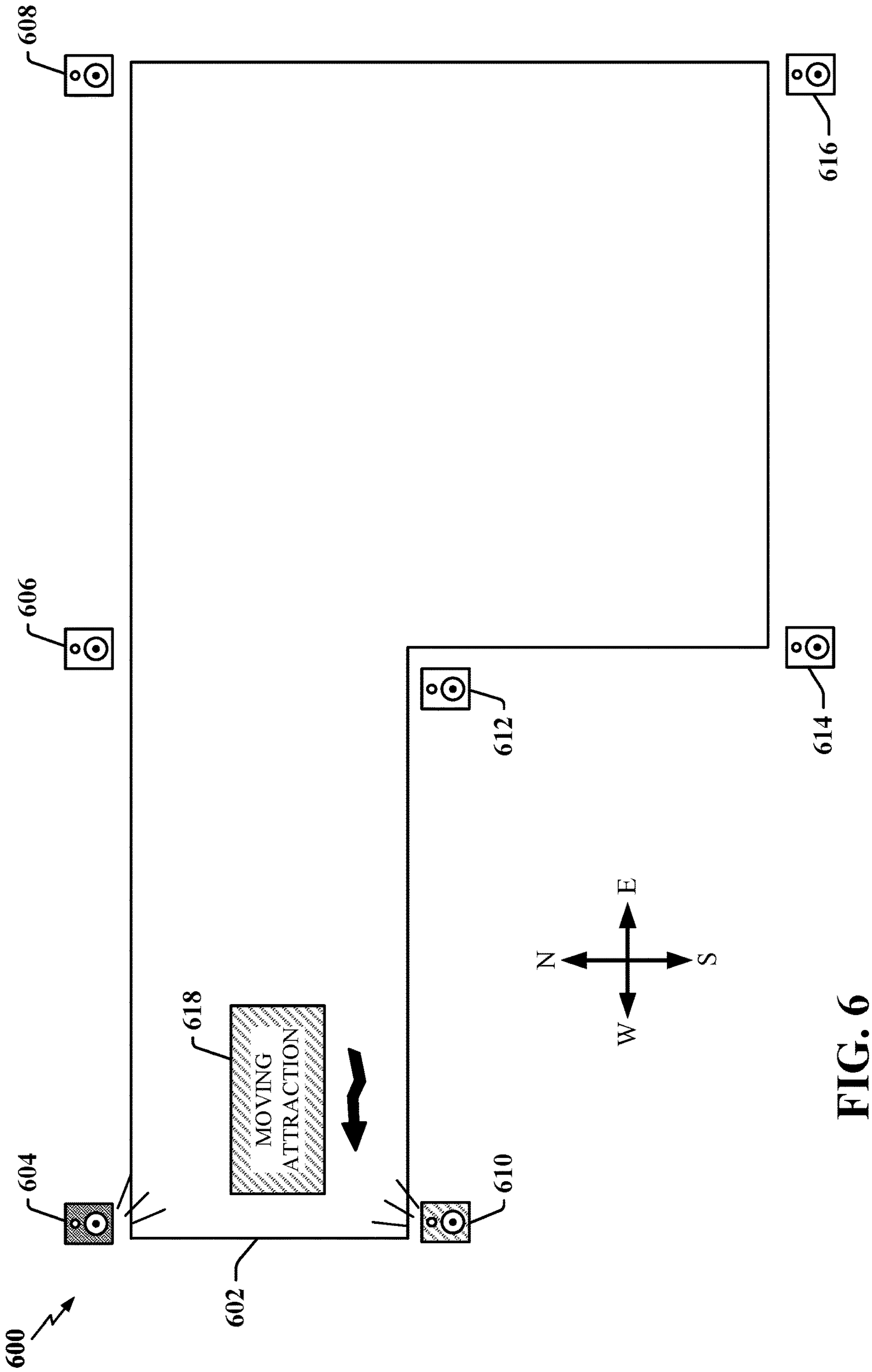
FIG. 6 illustrates an example implementation of an audio system in a three-dimensional (3D) space according to an aspect of the present disclosure.

FIG. 6 illustrates an example implementation 600 of an audio system (e.g., audio system 100) in a three-dimensional (3D) space 602 according to an aspect of the present disclosure. Similar to the 3D space 202 described above with respect to FIG. 2, the 3D space 602 of FIG. 6 may be, for example, a themed land or region of an amusement park. Moreover, one or more speakers of the audio system may have a defined position and direction and be placed at various locations throughout the space 602. For example, a first speaker 604, a second speaker 606, and a third speaker 608 may be placed at a northern edge of the space 602, a fourth speaker 610 and a fifth speaker 612 may be placed at a central portion of the space 602, and a sixth speaker 614 and a seventh speaker 616 may be placed at a southern edge of the space 602.

A moving attraction 618 (e.g., walk-around character or parade float) may travel within the space 602. Moreover, the audio system may be configured to emit an audio track associated with the moving attraction 618 through one or more speakers in the vicinity of the attraction. For example, while the moving attraction 618 is at its current location in the space 602, the audio system may determine (e.g., via the element detection system 114) a location of the moving attraction 618 and emit an associated audio track based on the determined location. As such, the audio system may emit the moving attraction's associated audio track via the first speaker 604 and the fourth speaker 610, which are in the vicinity of the moving attraction 618.

In an aspect, the presence of the moving attraction 618 at a certain location in the space 602 (e.g., northwestern portion of the space 602) may cause one or more speakers (e.g., first speaker 604) in the vicinity of the moving attraction to echo and/or reverberate while emitting the moving attraction's associated audio track, and thus, disrupt the listening enjoyment of the track. Accordingly, the audio system may compensate for any disruptive echo and/or reverberation caused by an offending speaker, as will be described with respect to FIG. 7 below.

Figure 7:
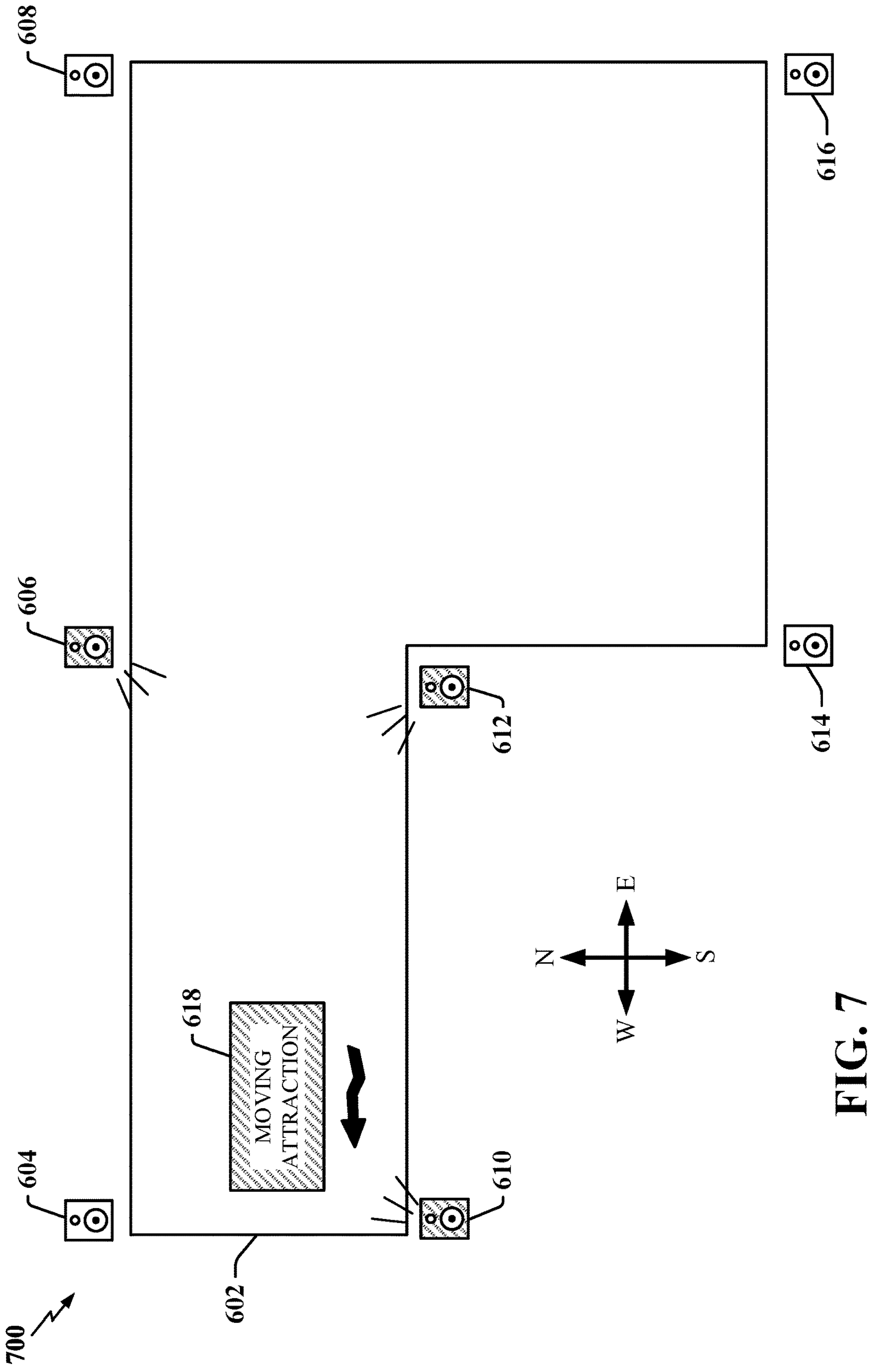
FIG. 7 illustrates another example implementation of the audio system in the three-dimensional (3D) space of FIG. 6 according to an aspect of the present disclosure.

FIG. 7 illustrates another example implementation 700 of the audio system (e.g., audio system 100) in the three-dimensional (3D) space 602 of FIG. 6 according to an aspect of the present disclosure. In an aspect, when the moving attraction 618 moves to a certain location in the space 602 (e.g., northwestern portion of the space 602), the audio system may determine (e.g., via the 3D modeler 120) that echo and/or reverberation from an offending speaker (e.g., first speaker 604) exists (or may potentially exist) during emission of the moving attraction's associated audio track. Accordingly, the audio system may lower the volume of (or completely disable) the offending speaker to eliminate any echo and/or reverberation, and therefore, facilitate a better listening experience (e.g., for amusement park guests) of the emitted audio track. For example, the audio system may lower the volume of (or disable) the first speaker 604 if the audio system determines (e.g., via the 3D modeler 120) that the echoes and/or reverberations from the first speaker 604 interfere with the emission of the audio track associated with the moving attraction 618.

In an aspect, the audio system may further balance the volume of the audio track emission to compensate for the lower volume (or disablement) of the offending speaker. For example, when the volume of the first speaker 604 is lowered (or when the first speaker 604 is disabled) due to echoes and/or reverberations, the audio system may detect (e.g., via the audio processor 122) a decrease in volume of the audio track emission. Accordingly, the audio system may enable speakers (e.g., second speaker 606 and fifth speaker 612) far away from (not in a local vicinity of) the moving attraction 618 to emit the moving attraction's associated audio track. As such, the audio system can maintain a preferred and/or acceptable volume level of the associated audio track and increase its listening enjoyment.

Figure 8:
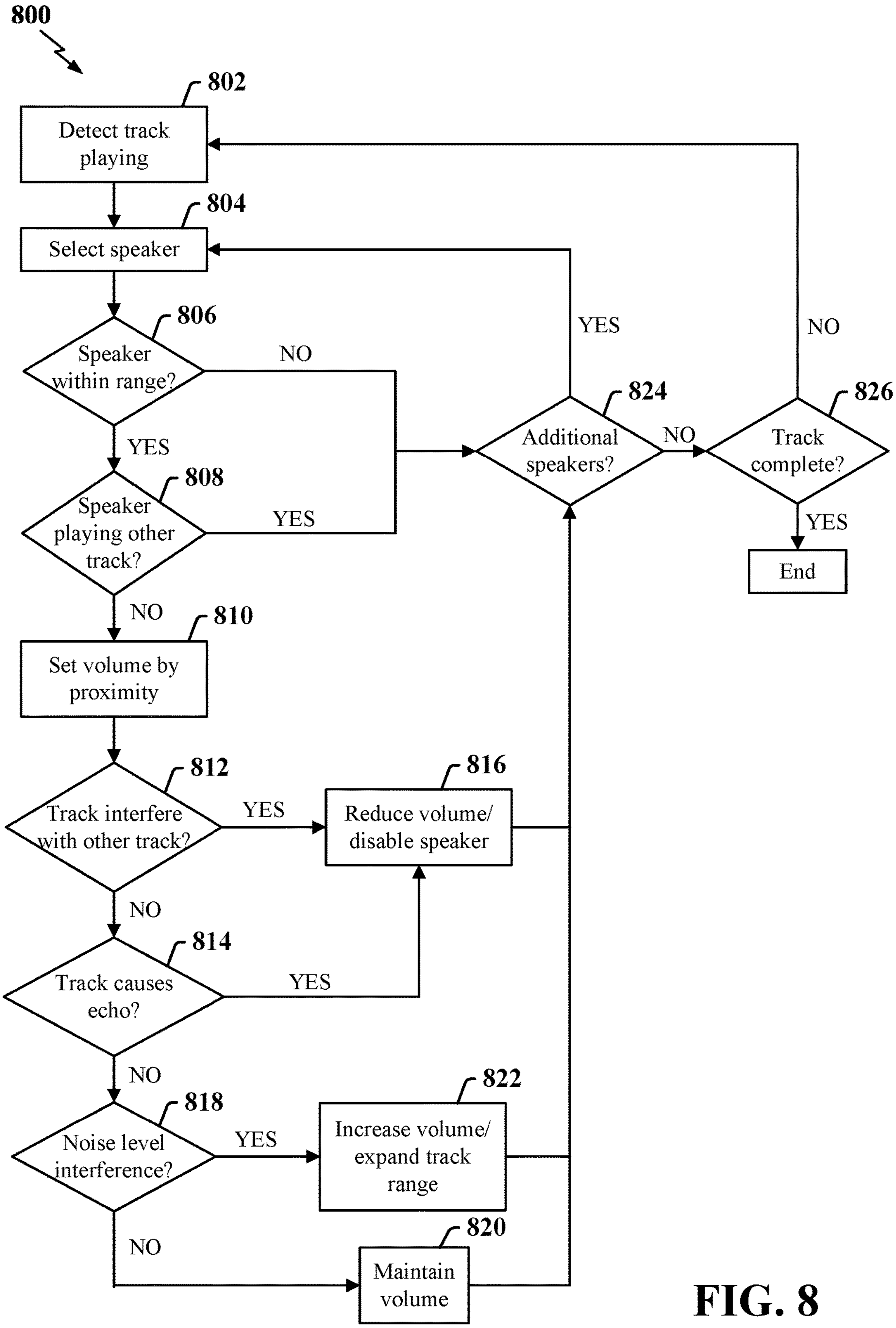
FIG. 8 is a flow chart illustrating an exemplary process for controlling an emission of an audio track in a three-dimensional (3D) space according to an aspect of the present disclosure.

FIG. 8 is a flow chart illustrating an exemplary process 800 for controlling an emission of an audio track in a three-dimensional (3D) space according to an aspect of the present disclosure. As described below, some or all illustrated features may be omitted in a particular implementation within the scope of the present disclosure, and some illustrated features may not be required for implementation of all aspects. In some examples, the process 800 may be carried out by the audio system 100 (e.g., via the processing devices 104) illustrated in FIG. 1, or by the audio system 1000 (e.g., via the control system 1014) illustrated in FIG. 10, which may be a computer, workstation, laptop, tablet, mobile phone, or any other type of electronic device capable of communicating with and/or controlling other electronic devices. In some examples, the process 800 may be carried out by any suitable apparatus or means for carrying out the functions or algorithm described below.

At block 802, the audio system detects an audio track being emitted and/or played in the 3D space via one or more speakers of an audio system. In an aspect, the audio track is associated with an attraction (e.g., moving attraction or fixed attraction) in an amusement park environment. At block 804, the audio system selects a speaker to control. The selected speaker may be one of the one or more speakers emitting and/or playing the audio track or may be a different speaker of the audio system.

At block 806, the audio system determines whether the selected speaker is within range (e.g., in the vicinity or within a predetermined distance) of the associated attraction for which the audio track is emitted. If the selected speaker is not within range of the associated attraction, the audio system proceeds to block 824 to determine the presence or non-presence of other speakers to be controlled. If the selected speaker is within range of the associated attraction, the audio system proceeds to block 808.

At block 808, the audio system determines whether the selected speaker is currently emitting another audio track (e.g., audio track not associated with the attraction and/or audio track different from the audio track detected at block 802). If the selected speaker is emitting the other track, the audio system proceeds to block 824 to determine the presence or non-presence of other speakers to be controlled. If the selected speaker is not emitting the other track, the audio system may begin emitting (or continue to emit) the audio track associated with the attraction via the selected speaker, and thereafter, proceed to block 810.

At block 810, the audio system sets a volume of the selected speaker to emit the audio track based on a proximity of the speaker to the attraction. For example, if the selected speaker is a large distance away from the attraction, then the audio system may set the volume of the speaker to a higher level. If the selected speaker is a small distance away from the attraction, then the audio system may set the volume of the speaker to a lower level.

At block 812, the audio system determines whether the emission of the audio track via the selected speaker interferes with the emission of another audio track. For example, the audio track emitted through the selected speaker may have less priority (may be less preferred) than another audio track (e.g., audio track associated with a moving attraction) emitted in the vicinity of the selected speaker. Accordingly, the emission of the audio track via the selected speaker may interfere with (disrupt the listening enjoyment of) the other audio track. Accordingly, if the audio system determines that the emission of the audio track via the selected speaker interferes with the emission of the other audio track, the audio system proceeds to block 816. At block 816, the audio system may reduce the volume of the selected speaker emitting the audio track, or otherwise disable the selected speaker, so as to not interfere with the emission of the other audio track.

If the emission of the audio track via the selected speaker does not interfere with the emission of the other audio track, the audio system proceeds to block 814. At block 814, the audio system determines whether the emission of the audio track causes an echo and/or reverberation through the selected speaker that disrupts the listening enjoyment of the audio track. If the audio system determines that the emission of the audio track causes the echo and/or reverberation, the audio system proceeds to block 816 where the audio system may reduce the volume of the selected speaker emitting the audio track, or otherwise disable the selected speaker, so as to eliminate the echo and/or reverberation.

If the audio system determines that the emission of the audio track does not cause the echo and/or reverberation, the audio system proceeds to block 818. At block 818, the audio system determines whether a noise level in the vicinity of the selected speaker (and/or the associated attraction for which the audio track is emitted) interferes with the emission of the audio track via the selected speaker. For example, when one or more noise-generating entities produce noise in an area near the selected speaker (and/or the associated attraction), the audio system may detect a change in sound level in the area. Based on the detected sound level, the audio system may determine that a noise level exceeds a threshold and interferes with the emission of the audio track via the selected speaker.

If the audio system determines that the noise level does not interfere with the emission of the audio track via the selected speaker, the audio system proceeds to block 820. At block 820, the audio system maintains the volume of the selected speaker emitting the audio track.

If the audio system determines that the noise level interferes with the emission of the audio track via the selected speaker, the audio system proceeds to block 822. At block 822, the audio system may increase the volume of the selected speaker emitting the audio track to compensate for the noise. In an aspect, the audio system may also utilize other speakers far away from (not in a local vicinity of) the selected speaker (and/or the associated attraction) to augment the sound of the audio track. Thus, the audio system can expand the area of audio track emission to account for the presence of noise near the selected speaker and/or the associated attraction.

Upon completion of the operations at blocks 816, 820, and 822, the audio system proceeds to block 824. At block 824, the audio system determines the presence or non-presence of any additional speakers to be controlled. If additional speakers are present, the audio system proceeds to block 804 to select one of the additional speakers for further controlling. If additional speakers are not present, the audio system proceeds to block 826.

At block 826, the audio system determines whether the emission of audio track is complete. If the emission of the audio track is not complete, the audio system proceeds back to block 802 to conduct further operations. If the emission of the audio track is complete, the audio system ends operations with respect to the detected audio track.

Figure 9:
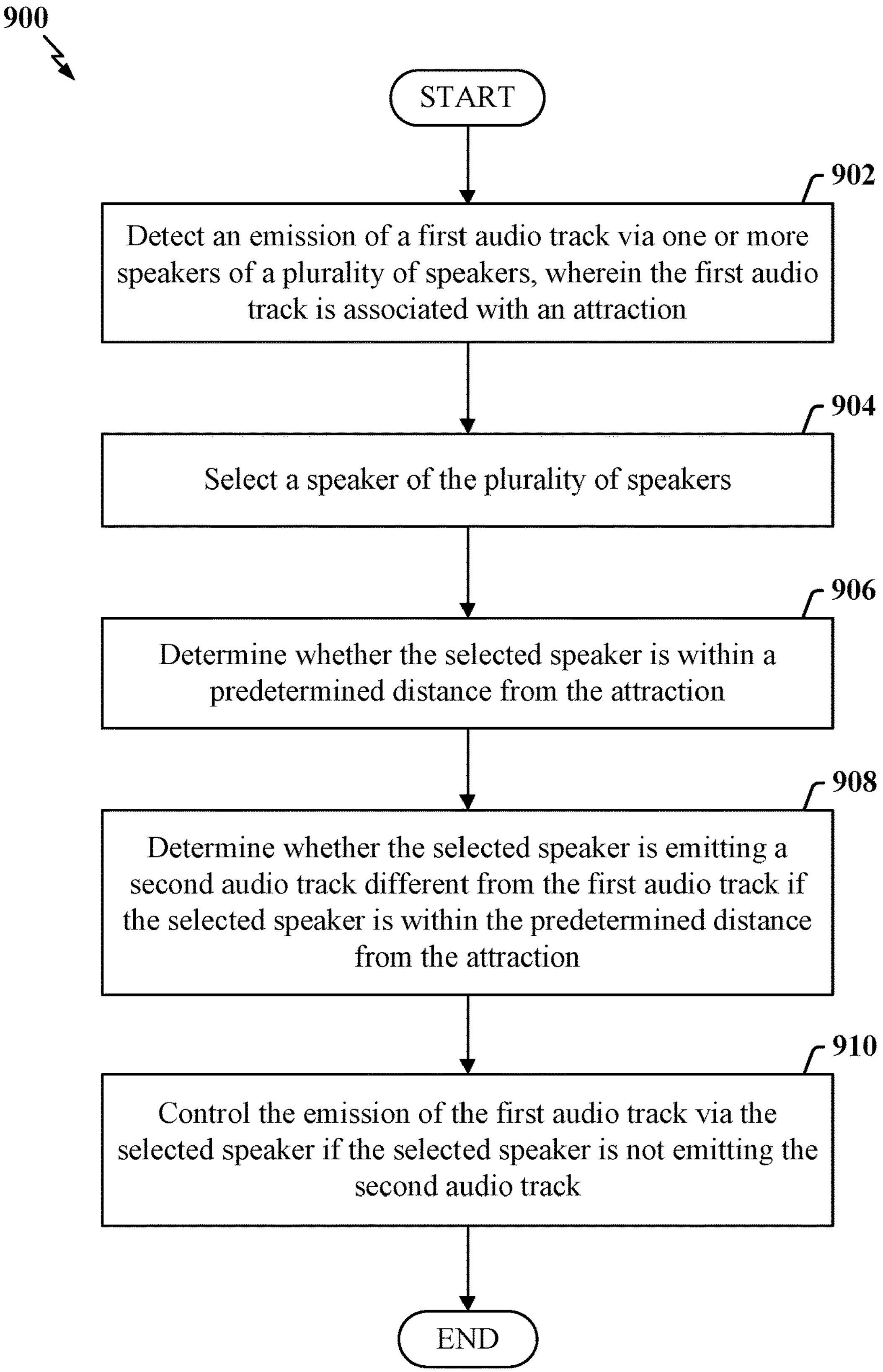
FIG. 9 is a flow chart illustrating an exemplary process for controlling an emission of an audio track in a three-dimensional (3D) space according to an aspect of the present disclosure.

FIG. 9 is a flow chart illustrating an exemplary process 900 for controlling an emission of an audio track in a three-dimensional (3D) space according to an aspect of the present disclosure. As described below, some or all illustrated features may be omitted in a particular implementation within the scope of the present disclosure, and some illustrated features may not be required for implementation of all aspects. In some examples, the process 900 may be carried out by the audio system 100 (e.g., via the processing devices 104) illustrated in FIG. 1, or by the audio system 1000 (e.g., via the control system 1014) illustrated in FIG. 10, which may be a computer, workstation, laptop, tablet, mobile phone, or any other type of electronic device capable of communicating with and/or controlling other electronic devices. In some examples, the process 900 may be carried out by any suitable apparatus or means for carrying out the functions or algorithm described below.

At block 902, the audio system detects (e.g., via audio tracks 110, 3D modeler 120, and/or audio processor 122) an emission of a first audio track via one or more speakers of a plurality of speakers (e.g., speakers 130). The first audio track is associated with an attraction. For example, the attraction may be a moving attraction (e.g., walk-around character or parade float) or a fixed attraction (e.g., restaurant, carnival game booth, or show stage).

At block 904, the audio system selects (e.g., via 3D modeler 120 and/or audio processor 122) a speaker of the plurality of speakers. In an aspect, the selected speaker is one of the speakers included in the one or more speakers emitting the first audio track. In another aspect, the selected speaker is a speaker separate from the one or more speakers emitting the first audio track.

At block 906, the audio system determines (e.g., via element detection system 114, 3D modeler 120 and/or audio processor 122) whether the selected speaker is within a predetermined distance from the attraction. If the selected speaker is not within the predetermined distance from the attraction, the audio system may select another speaker to control if available.

If the selected speaker is within the predetermined distance from the attraction, at block 908, the audio system determines (e.g., via audio tracks 110 and/or audio processor 122) whether the selected speaker is emitting a second audio track different from the first audio track. For example, the second audio track may be a track not associated with the attraction. If the selected speaker is emitting the second audio track, the audio system may select another speaker to control if available. If the selected speaker is not emitting the second audio track, at block 910, the audio system controls (e.g., via audio processor 122) the emission of the first audio track via the selected speaker.

In an aspect, the audio system controls the emission of the first audio track via the selected speaker by determining (e.g., element detection system 114) a proximity of the selected speaker to the attraction and setting a volume of the selected speaker for emitting the first audio track based on the proximity. For example, if the selected speaker is a large distance away from the attraction, then the audio system may set the volume of the selected speaker to a higher level. If the selected speaker is a small distance away from the attraction, then the audio system may set the volume of the selected speaker to a lower level.

In another aspect, the audio system controls the emission of the first audio track via the selected speaker by determining (e.g., via element detection system 114) whether the emission of the first audio track via the selected speaker interferes with the emission of another audio track. For example, the first audio track may have less priority (may be less preferred) than another audio track emitted in the vicinity of the selected speaker. Therefore, the emission of the first audio track via the selected speaker may interfere with (disrupt the listening enjoyment of) the other audio track. If so, the audio system may control the emission by reducing the volume of the selected speaker for emitting the first audio track or disabling the selected speaker entirely in order to prevent the interference.

In a further aspect, the audio system controls the emission of the first audio track via the selected speaker by determining (e.g., via 3D modeler 120) whether the emission of the first audio track via the selected speaker causes an echo and/or reverberation through the selected speaker. If so, the audio system may control the emission by reducing the volume of the selected speaker for emitting the first audio track or disabling the selected speaker entirely in order to eliminate the echo and/or reverberation.

In another aspect, the audio system controls the emission of the first audio track via the selected speaker by determining (e.g., via feedback microphones 112) whether a noise level in a vicinity of the selected speaker or the attraction interferes with the emission of the first audio track via the selected speaker. For example, when one or more noise-generating entities produce noise in an area near the selected speaker (and/or the associated attraction), the audio system may detect a change in sound level in the area. Based on the detected sound level, the audio system may determine that a noise level exceeds a threshold and interferes with the emission of the first audio track via the selected speaker. Accordingly, the audio system may control the emission by increasing the volume of the selected speaker for emitting the first audio track if the noise level interferes with the emission of the first audio track, or maintaining the volume of the selected speaker for emitting the first audio track if the noise level does not interfere with the emission of the first audio track. The audio system may also emit the first audio track via at least one speaker that is not in the vicinity of the selected speaker or the attraction if the noise level interferes with the emission of the first audio track. Thus, the audio system can expand the area of the first audio track emission to compensate for the presence of noise near the selected speaker and/or the attraction.

Figure 10:
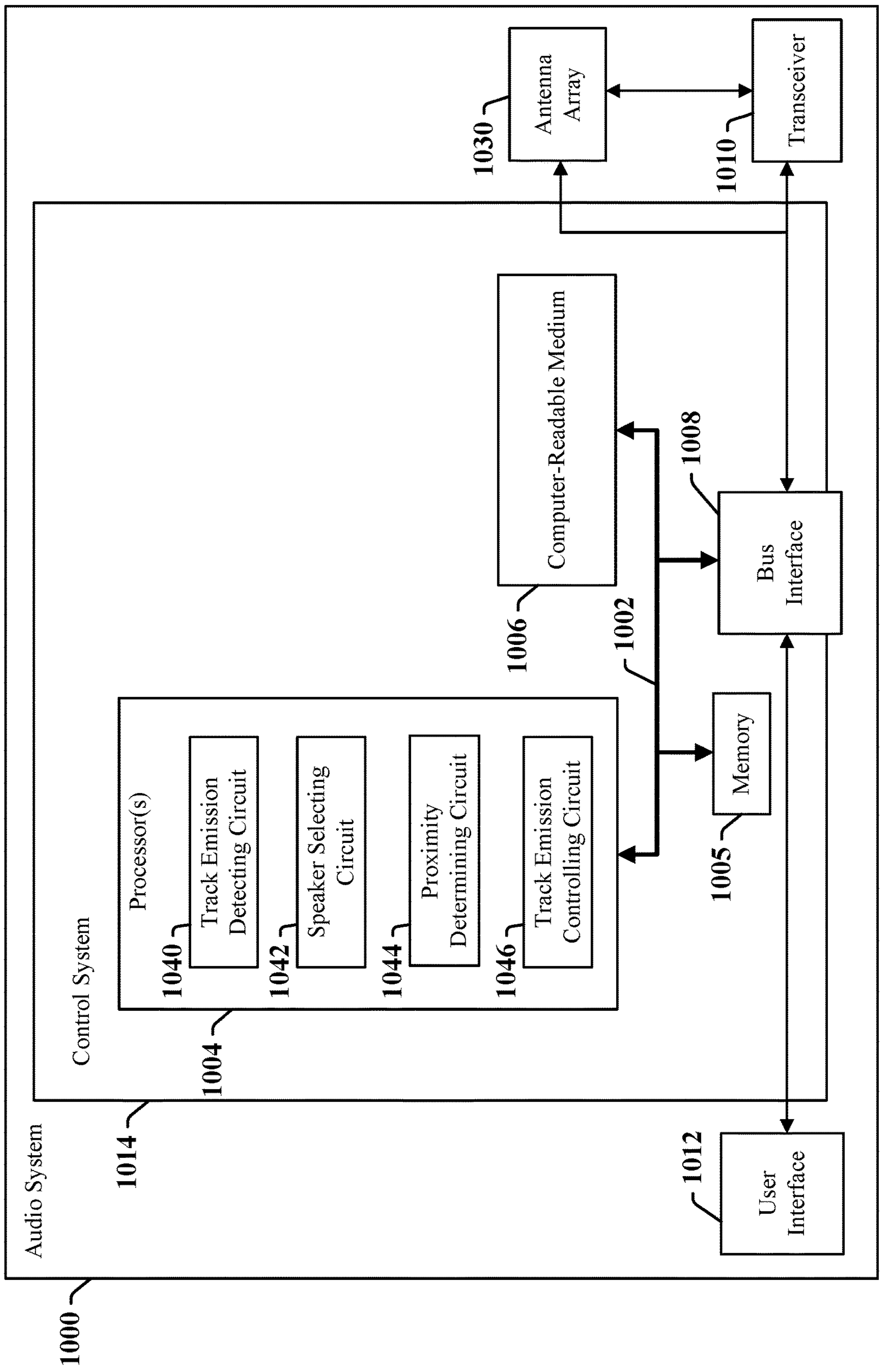
FIG. 10 is a block diagram illustrating an example of a hardware implementation for an exemplary audio system employing a control system according to an aspect of the present disclosure.

FIG. 10 is a block diagram illustrating an example of a hardware implementation for an exemplary audio system 1000 employing a control system 1014. For example, the audio system 1000 may be a computer, workstation, laptop, tablet, mobile phone, or any other type of electronic device capable of communicating with and/or controlling other electronic devices. Moreover, the control system 1014 may be the processing devices 104 shown in FIG. 1. The control system 1014 includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the audio system 1000 may be configured to perform any one or more of the functions described herein. That is, the processor 1004, as utilized in an audio system 1000, may be used to implement any one or more of the processes and procedures described and illustrated in FIGS. 8 and 9.

In this example, the control system 1014 may be implemented with a bus architecture, represented generally by a bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium (e.g., via a wired connection or a wireless connection using an antenna array 1030). For example, the transceiver 1010 may provide a communication interface between the control system 1014 and the audio tracks 110, the feedback microphones 112, the element detection system 114, the 3D modeler 120, the audio processor 122, and/or the speakers 130. Depending upon the nature of the device, a user interface 1012 (e.g., keypad, display, speaker, microphone, joystick) may also be provided. Of course, such a user interface 1012 is optional, and may be omitted in some examples.

In some aspects of the disclosure, the processor 1004 may include track emission detecting circuitry 1040 configured for various functions, including, for example, detecting an emission of a first audio track via one or more speakers of a plurality of speakers, wherein the first audio track is associated with an attraction. For example, the track emission detecting circuitry 1040 may be configured to implement one or more of the functions described above in relation to FIG. 9, including, e.g., block 902. The processor 1004 may also include speaker selecting circuitry 1042 configured for various functions, including, for example, selecting a speaker of the plurality of speakers. For example, the speaker selecting circuitry 1042 may be configured to implement one or more of the functions described above in relation to FIG. 9, including, e.g., block 904. The processor 1004 may also include proximity determining circuitry 1044 configured for various functions, including, for example, determining whether the selected speaker is within a predetermined distance from the attraction. For example, the proximity determining circuitry 1044 may be configured to implement one or more of the functions described above in relation to FIG. 9, including, e.g., block 906. Accordingly, the track emission detecting circuitry 1040 may also be configured for determining whether the selected speaker is emitting a second audio track different from the first audio track if the selected speaker is within the predetermined distance from the attraction. For example, the track emission detecting circuitry 1040 may be configured to implement the function described above in relation to FIG. 9, e.g., block 908. The processor 1004 may also include track emission controlling circuitry 1046 configured for various functions, including, for example, controlling the emission of the first audio track via the selected speaker if the selected speaker is not emitting the second audio track. For example, the track emission detecting circuitry 1046 may be configured to implement one or more of the functions described above in relation to FIG. 9, including block 910.

The processor 1004 is responsible for managing the bus 1002 and general processing, including the execution of software stored on the computer-readable medium 1006. The software, when executed by the processor 1004, causes the control system 1014 to perform the various functions described above for any particular apparatus. The computer-readable medium 1006 and the memory 1005 may also be used for storing data that is manipulated by the processor 1004 when executing software.

One or more processors 1004 in the control system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the control system 1014, external to the control system 1014, or distributed across multiple entities including the control system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A system, comprising:
an audio system;
a plurality of speakers of the audio system, wherein one or more speakers of the plurality of speakers is coupled with a fixed attraction and the audio system is configured to emit a plurality of audio tracks into an environment of the fixed attraction via the plurality of speakers;
a moving attraction configured to travel relative to the fixed attraction within the environment, wherein the moving attraction is associated with a first audio track of the plurality of audio tracks, and the first audio track is different than a second audio track of the plurality of audio tracks; and
a control system comprising one or more processors, wherein the control system is configured to;
selectively control the one or more speakers of the plurality of speakers to emit the first audio track and refrain from emitting the second audio track based on the moving attraction being within a threshold distance of the one or more speakers.

2. The system of claim 1, comprising an element detection system configured to detect a location of the moving attraction to establish a detected location of the moving attraction, wherein the control system is configured to:
control a first subset of the one or more speakers to emit the first audio track based on the detected location being a first location that is within the threshold distance of the first subset of the one or more speakers; and
control a second subset of the one or more speakers, different than the first subset of the one or more speakers, to emit the second audio track based on the detected location being a second location that is beyond the threshold distance of the second subset of the one or more speakers.

3. The system of claim 2, wherein the control system comprises a 3D modeler configured to provide a 3D model of a soundscape within the environment.

4. The system of claim 3, wherein the control system is configured to:
determine an interference with the first audio track within the environment based on the 3D model, wherein the interference is associated with an offending device, an offending attraction, and/or an offending interactive element within the environment; and
adjust parameters of the offending device, the offending attraction, and/or the offending interactive element to block the interference.

5. The system of claim 3, wherein the control system is configured to:
determine an interference with the first audio track within the environment based on the 3D model, wherein the interference is associated with an offending one or more speakers of the plurality of speakers; and
adjust operation of the offending one or more speakers.

6. The audio system of claim 3, wherein the control system is configured to:
determine, via the 3D modeler, a speaker of the plurality of speakers is causing or predicted to cause an echo and/or reverberation based on the 3D model; and
control a volume level of the speaker or disable the speaker to block the echo and/or the reverberation.

7. The system of claim 1, wherein the one or more speakers is a subset of the plurality of speakers including more than one speaker of the plurality of speakers and the control system is configured to set individual volume levels of individual speakers of the subset of the plurality of speakers based on respective distances between the individual speakers and a detected location of the moving attraction.

8. The system of claim 1, comprising one or more feedback microphones disposed on the moving attraction or in the environment, wherein the control system is configured to, in response to detecting a change in sound levels beyond a sound level threshold based on data from the one or more feedback microphones, adjust volume levels of all or a portion of the plurality of speakers, adjust the threshold distance, or both.

9. The system of claim 1, wherein the control system is configured to:
control a subset of the plurality of speakers to emit the second audio track;
determine whether an emission of the first audio track associated with the moving attraction and an emission of the second audio track interfere with each other; and
in response to determining the emission of the first audio track associated with the moving attraction and the emission of the second audio track interfere with each other, adjust operation of at least a portion of the subset of the plurality of speakers.

10. The system of claim 9, wherein the control system is configured to:
determine whether the one or more speakers and the subset of the plurality of speakers comprise at least one common speaker;
in response to determining that the one or more speakers and the subset of the plurality of speakers comprise the at least one common speaker:
block the second audio track from being presented via the at least one common speaker based on prioritization of the first audio track over the second audio track; or
block the first audio track from being presented via the at least one common speaker based on prioritization of the second audio track over the first audio track.

11. The system of claim 1, wherein the plurality of speakers are disposed at a plurality of respective defined positions within the environment.

* * * * *